United States Patent
Conway

(10) Patent No.: US 11,378,141 B2
(45) Date of Patent: Jul. 5, 2022

(54) EARLY WARNING SYSTEM FOR CENTRIFUGAL CLUTCH

(71) Applicant: Carrier Corporation, Palm Beach Gardens, FL (US)

(72) Inventor: Richard Conway, Athens, GA (US)

(73) Assignee: Carrier Corporation, Palm Beach Gardens, FL (US)

( * ) Notice: Subject to any disclaimer, the term of this patent is extended or adjusted under 35 U.S.C. 154(b) by 51 days.

(21) Appl. No.: 17/248,159

(22) Filed: Jan. 12, 2021

(65) Prior Publication Data

US 2021/0254673 A1    Aug. 19, 2021

Related U.S. Application Data

(60) Provisional application No. 62/976,510, filed on Feb. 14, 2020.

(51) Int. Cl.
*F16D 43/18* (2006.01)
*B60H 1/32* (2006.01)

(52) U.S. Cl.
CPC ........... *F16D 43/18* (2013.01); *B60H 1/3222* (2013.01); *F16D 2300/20* (2021.01)

(58) Field of Classification Search
CPC .......................... F16D 43/14–18; F16F 1/18–30
See application file for complete search history.

(56) References Cited

U.S. PATENT DOCUMENTS

| | | | | |
|---|---|---|---|---|
| 1,884,873 A | * | 10/1932 | Roberts | F16D 43/18 192/75 |
| 3,779,355 A | * | 12/1973 | Okuno | F16D 43/18 188/185 |
| 3,786,776 A | * | 1/1974 | Buthe | A01B 61/025 192/30 W |
| 5,048,657 A | * | 9/1991 | Dissett | F16D 47/02 192/105 CD |
| 2004/0012135 A1 | * | 1/2004 | Abergel | F16F 1/185 267/166 |
| 2021/0317884 A1 | * | 10/2021 | Conway | F16D 13/14 |

* cited by examiner

*Primary Examiner* — David R Morris
(74) *Attorney, Agent, or Firm* — James A. Edwards

(57) ABSTRACT

A leaf spring for a centrifugal clutch of a transport refrigeration unit, and a centrifugal clutch incorporating the leaf spring are provided. The centrifugal clutch includes a drum, a hub, at least two friction pads, and at least one leaf spring between each respective friction pad. The leaf spring includes a frame and an indicator tab. The indicator tab of the leaf spring is configured to indicate when at least one friction pad of the centrifugal clutch is in need of replacement. This indication may be in the form of an audible sound generated when the indicator tab engages the internally facing surface of the drum. The indicator tab may be configured to only be able to engage the internally facing surface of the drum when the friction material of the friction pad has a thickness suggesting it is worn.

20 Claims, 9 Drawing Sheets

EARLY WARNING SYSTEM FOR CENTRIFUGAL CLUTCH

CROSS REFERENCE TO A RELATED APPLICATION

The application claims the benefit of U.S. Provisional Application No. 62/976,510 filed Feb. 14, 2020, the contents of which are hereby incorporated in their entirety.

BACKGROUND

Refrigerated trucks and trailers are commonly used to transport perishable goods, such as, for example, produce, meat, poultry, fish, dairy products, cut flowers, and other fresh or frozen perishable products. To maintain the perishable goods, typically, a transport refrigeration unit is mounted to the truck or to the trailer. The transport refrigeration unit can be driven either mechanically (e.g. via a direct mechanical coupling or belt drive) or electrically. When mechanically driven, the transport refrigeration unit typically can derive power either from the vehicle engine or from an independent engine inside the transport refrigeration unit.

When the engine is not running, or isn't running at a high enough speed, typically the transport refrigeration unit is powered by an electrical standby motor. Once the engine is running and is at a high enough speed, the transport refrigeration unit switches from being electrically driven (e.g., by the electric standby motor) to being mechanically driven (e.g., by the vehicle engine or the independent engine inside the transport refrigeration unit). To facilitate the engagement of the engine (e.g. the vehicle engine or the independent engine) by the transport refrigeration unit, typically a clutch (e.g. a centrifugal clutch) is used. The clutch allows the engine to develop enough speed and torque before it is engaged to rotate the compressor of the transport refrigeration unit. Without allowing the engine to develop enough speed and torque, the resistance to rotation from the compressor at the onset could potentially cause the engine to stall.

Conventional centrifugal clutches have a pair of friction pads mounted to the driving rotor or hub through pivot posts. To retract the friction pads and to control the torque-speed curve, conventional centrifugal clutches typically use a biasing mechanism (e.g. one or more leaf springs or coil springs). As the engine develops speed and centrifugal force, the biasing mechanism is forced open, allowing for the friction pads to radially extend outward toward the clutch drum. To engage the clutch drum and provide enough torque to allow the transport refrigeration unit's loads to be driven by the engine, the friction pads need to form a sufficient contact with the clutch drum. To provide sufficient contact, the friction pads commonly use a layer of friction material (e.g. synthetic resin impregnated with metal, organic, or ceramic fibers). However, this layer wears down as the clutch is repeatedly used (e.g. repeated slipping of the clutch can cause wearing of the friction material). Once the material on the friction pads is worn down the friction pads need to be replaced in order for the clutch to be able to transmit the power from the engine to drive the transport refrigeration unit's loads without causing damage to the clutch and/or other components. Currently there is no way to know whether or not the friction pads are worn down to the point that they need to be replaced. As such, these friction pads are commonly replaced upon clutch failure, which, when happening unexpectedly, has the potential to cause the unit to stop work resulting in the perishable goods becoming spoiled.

Accordingly, there remains a need for an early warning system for a centrifugal clutch to help ensure that the friction pads are replaced when needed.

BRIEF DESCRIPTION

According to one embodiment, a centrifugal clutch of a transport refrigeration unit is provided. The centrifugal clutch includes a drum, a hub disposed within the drum, at least two friction pad assemblies connected to the hub, and at least one leaf spring configured between each respective friction pad. The drum includes an internally facing surface. The hub is configured to be rotatably driven by an engine configured to power the transport refrigeration unit. Each friction pad assembly includes a radially outward facing surface which has a friction material for contacting the internally facing surface, the friction material has an installed thickness. Each leaf spring includes a frame with a first side and a second side, and an indicator tab extending from the second side.

In accordance with additional or alternative embodiments, the centrifugal clutch defines an extended position and a retracted position.

In accordance with additional or alternative embodiments, the centrifugal clutch is in an extended position when the hub is rotatably driven at 400 RPMs or greater.

In accordance with additional or alternative embodiments, the indicator tab is configured to engage the internally facing surface of the drum when the centrifugal clutch is in the extended position and the installed thickness is worn to a worn thickness.

In accordance with additional or alternative embodiments, the worn thickness is approximately 10% of the installed thickness.

In accordance with additional or alternative embodiments, the engaging of the internally facing surface of the drum by the indicator tab creates an audible sound.

In accordance with additional or alternative embodiments, the audible sound indicates that at least one friction pad is in need of replacement.

In accordance with additional or alternative embodiments, the centrifugal clutch is configured to transmit a torque from the engine to a compressor within the transport refrigeration unit.

In accordance with additional or alternative embodiments, the engine is within the transport refrigeration unit and is a diesel engine.

In accordance with additional or alternative embodiments, the friction material is a synthetic resin impregnated with metal, organic, or ceramic fibers.

In accordance with additional or alternative embodiments, from a side view, each friction pad is configured in a C-shape.

In accordance with additional or alternative embodiments, from a side view, the combination of the friction pads and the leaf springs form a circular shape.

According to another aspect of the disclosure, a leaf spring for a centrifugal clutch of a transport refrigeration unit is provided. The leaf spring includes a frame with a first side and a second side, and an indicator tab extending from the second side.

In accordance with additional or alternative embodiments, from a side view, the frame is configured in a C-shape in the direction of the first side.

In accordance with additional or alternative embodiments, from a top view, the frame is configured in an H-shape, the indicator tab extending from a slot defined by the H-shape.

In accordance with additional or alternative embodiments, from a side view, the indicator tab is configured in a C-shape.

In accordance with additional or alternative embodiments, the leaf spring additionally includes a first end and a second end, each of the first end and the second end being configured in an arc.

In accordance with additional or alternative embodiments, the first end is configured to latch to a first friction pad, and the second end is configured to latch to a second friction pad.

In accordance with additional or alternative embodiments, the indicator tab and the frame are unified.

In accordance with additional or alternative embodiments, the leaf spring is made of a metal.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

It can be difficult to know when one or more friction pads of a centrifugal clutch within a transport refrigeration unit need to be replaced. For example, it may be difficult to know whether a friction pad is worn down to the point that it needs to be replaced without removing the transport refrigeration unit from the truck and disassembling the transport refrigeration unit to visually inspect the one or more friction pads. To help indicate when one or more friction pads need to be replaced, a leaf spring with an indicator tab, and a centrifugal clutch of a transport refrigeration unit incorporating the leaf spring are provided. In certain instances, the indicator tab may be configured in another location or mechanism (e.g., incorporated into the friction pad, provided as an independent clasping mechanism, or any other location or mechanism which may aid in the identification of a worn friction pad). The leaf spring makes it possible to know when the friction material (e.g. synthetic resin impregnated with metal, organic, or ceramic fibers) on one or more of the friction pads are worn down to the point that replacement is needed. The leaf spring, by providing indication that one or more friction pads are in need of replacement, may help reduce unexpected failures of the centrifugal clutch caused by the clutch not engaging.

Figure 1:
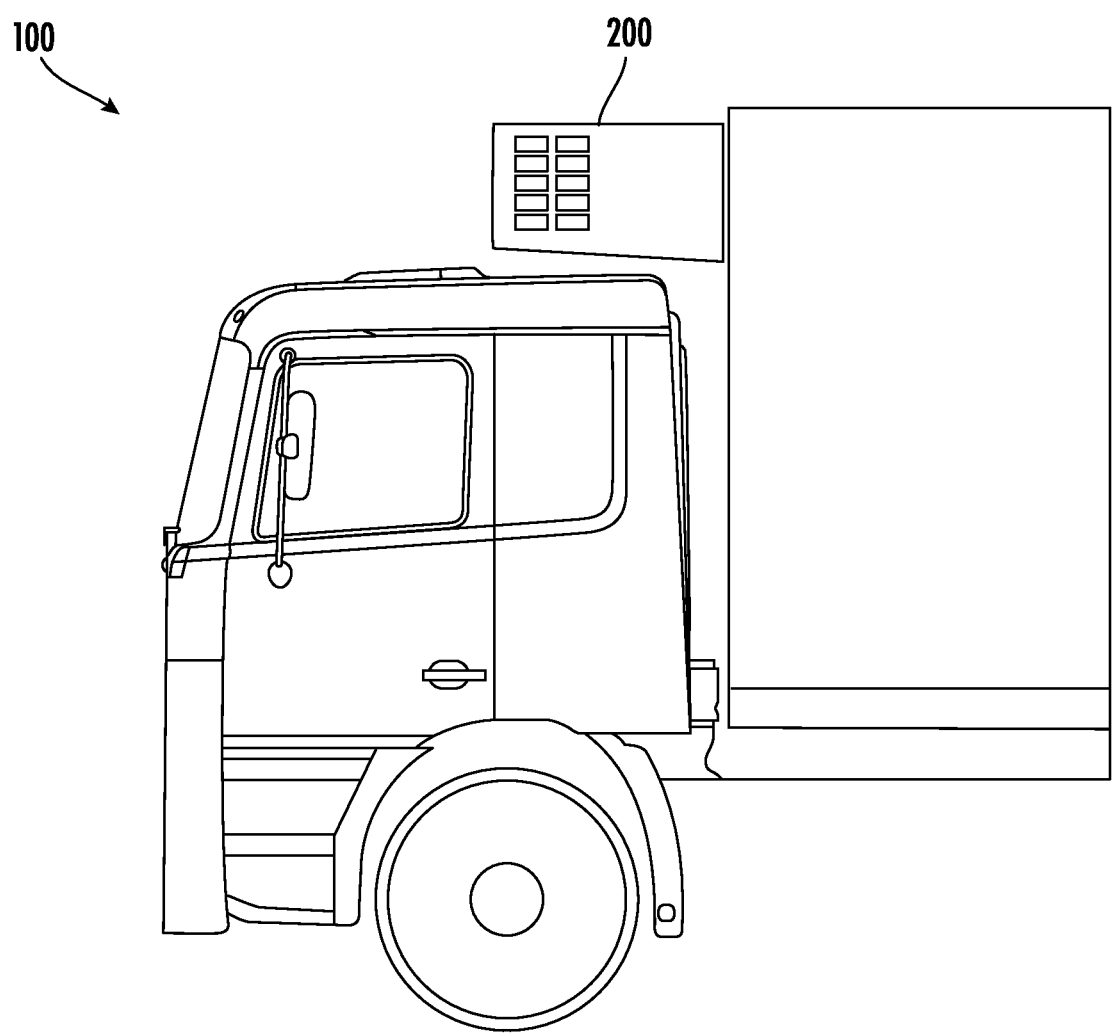
FIG. 1 is a perspective view of a truck with a transport refrigeration unit in accordance with one aspect of the disclosure.
Figure 2:
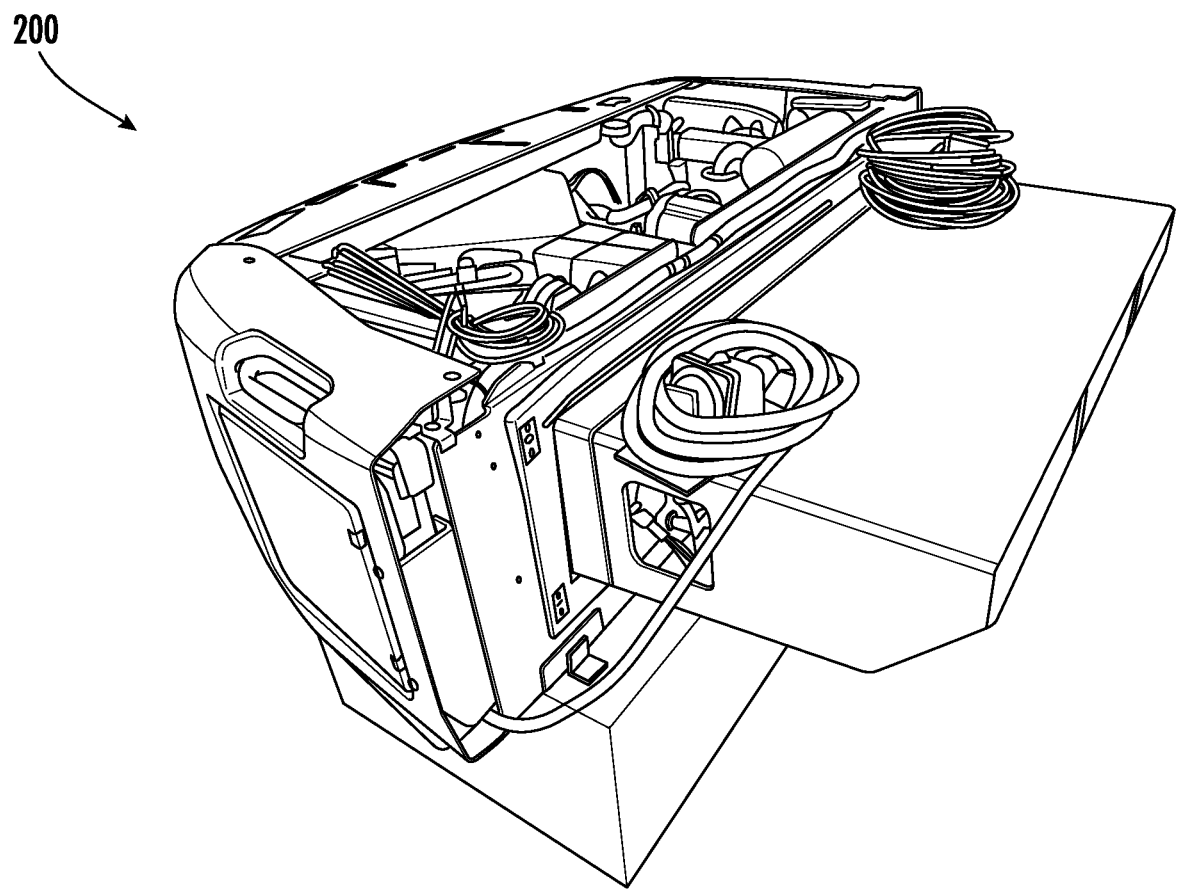
FIG. 2 is a perspective view of a transport refrigeration unit in accordance with one aspect of the disclosure.

Transport refrigeration units use centrifugal clutches to facilitate the transmission of the engine power (e.g. the vehicle engine or the independent engine within the transport refrigeration unit) to the transport refrigeration unit's load. An exemplary transport refrigeration unit 200 mounted to a refrigerated truck 100 is shown in FIG. 1. A standalone transport refrigeration unit 200 is shown in FIG. 2. The transport refrigeration unit 200 includes a compressor 500, a condenser (not shown), an evaporator coil (not shown), and an evaporator fan (not shown).

Figure 3:
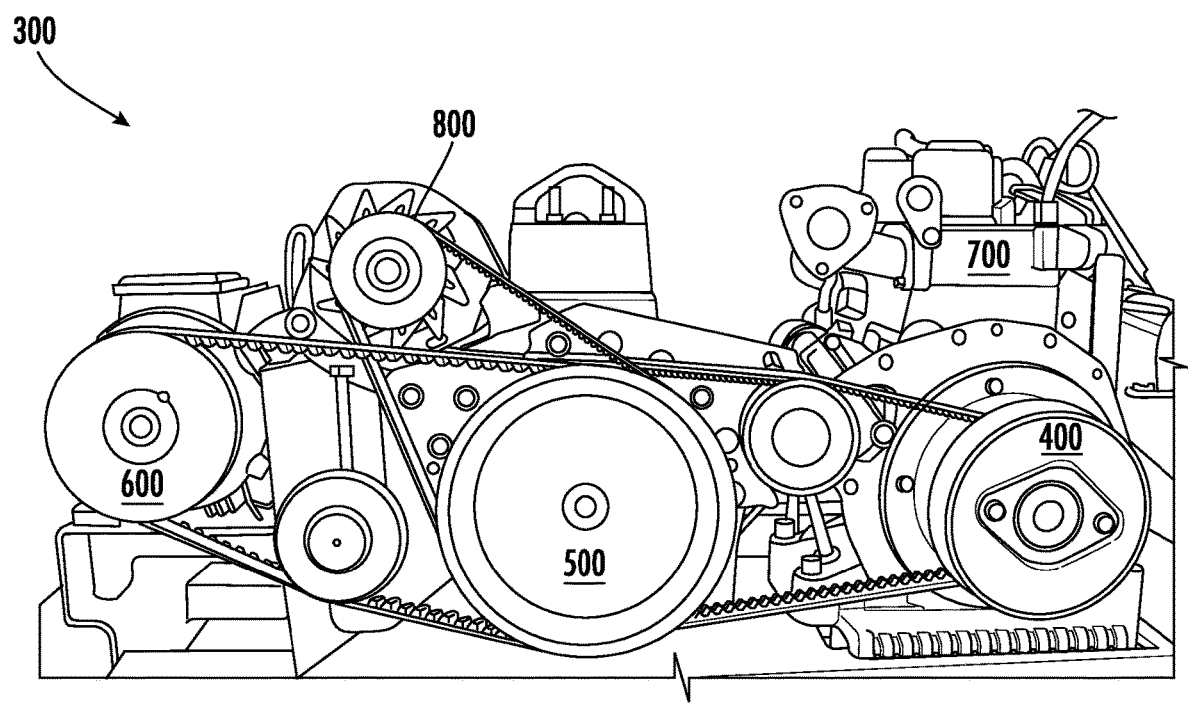
FIG. 3 is a perspective view of the powertrain of the transport refrigeration unit shown in FIG. 2 with a centrifugal clutch in accordance with one aspect of the disclosure.

As shown in FIG. 3, the transport refrigeration unit 200 (e.g., the compressor 500 of the transport refrigeration unit 200) can be driven by an independent engine 700 (e.g., a diesel engine) within the transport refrigeration unit 200. FIG. 3 depicts a powertrain 300 of a transport refrigeration unit 200. The powertrain 300 of a transport refrigeration unit 200 may include a centrifugal clutch 400, a compressor 500, an electric motor 600, an independent engine 700 (e.g., within the transport refrigeration unit 200), and an alternator 800. The centrifugal clutch 400 may drive the loads in the powertrain 300, which may consist of a compressor 500, electric motor 600, and alternator 800. For example, the centrifugal clutch 400 may not engage the engine 700 until the engine 700 develops enough speed and torque. As an alternative to being driven by the engine 700, the compressor 500 may be driven by the electric motor 600 so that the centrifugal clutch 400 does not transmit any torque to the engine. By using a centrifugal clutch 400 the transport refrigeration unit 200 may gradually apply the loads in the powertrain 300 to avoid inadvertent engine 700 stalling, which could occur if the loads in the powertrain 300 were applied to the engine 700 before the engine 700 developed enough speed and torque.

Figure 4:
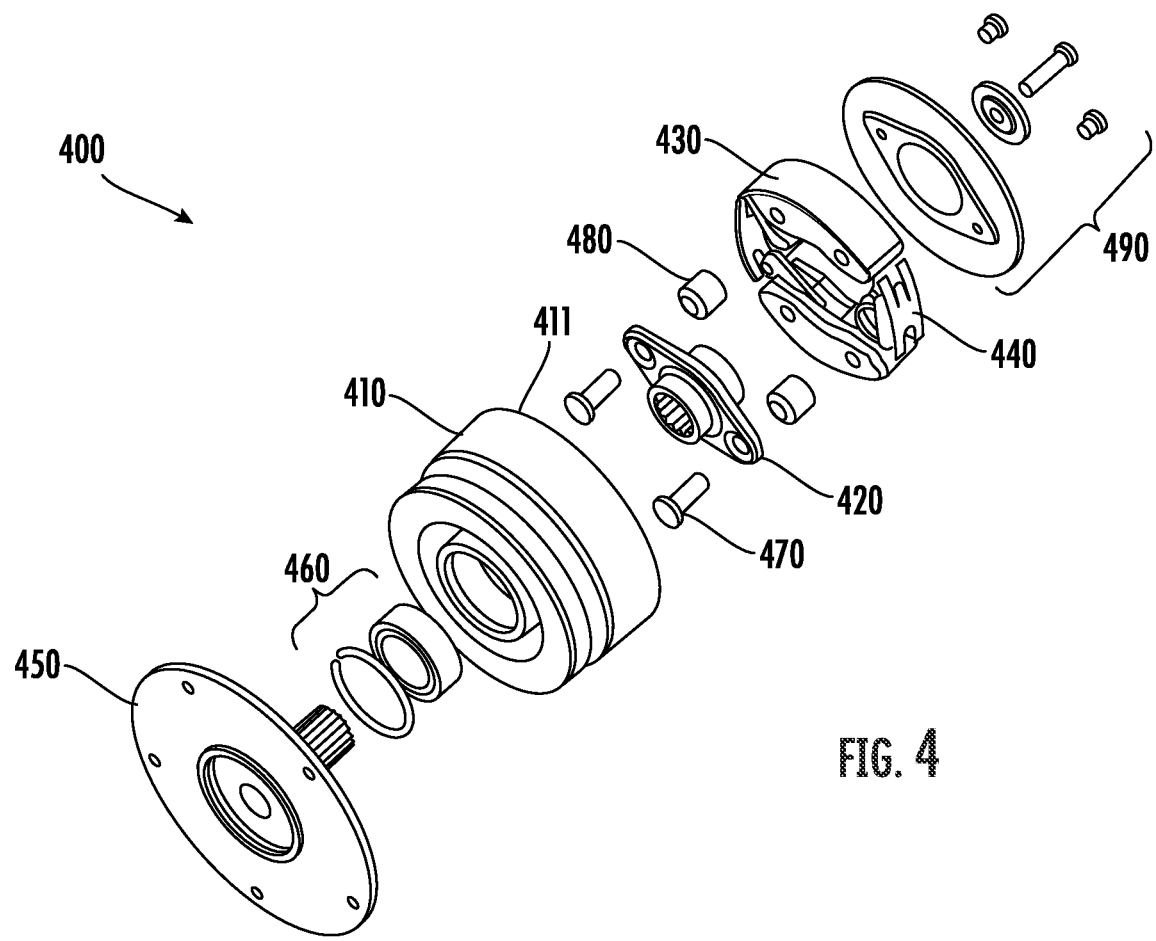
FIG. 4 is an exploded view of the centrifugal clutch shown in FIG. 3 in accordance with one aspect of the disclosure.

An exploded view of a centrifugal clutch 400 of a transport refrigeration unit 200 is shown in FIG. 4. The centrifugal clutch 400 includes a drum 410, a hub 420, at least two friction pad assemblies 430, and at least one leaf spring 440 configured between each respective friction pad assembly 430. The drum 410 includes an internally facing surface 411. The hub 420 is configured to be disposed within the drum 410. The hub 420 is configured to be rotatably driven by an engine 700 within a transport refrigeration unit 200. For example, the hub 420 may be connected to a flywheel 450 so that the hub 420 can rotatably driven within the drum 410. In certain instances, the drum 410 is disposed between the hub 420 and the flywheel 450 with bearings 460 at the intersection of the flywheel 450 and the drum 410. The friction pad assemblies 430 are connected to the hub 420, for example, using one or more shaft 470 and/or bushing 480. Each friction pad assembly 430 includes a radially outward facing surface 431 (shown in FIG. 6), which includes a friction material for contacting the internally facing surface 411 of the drum 410. When installed, the friction material of each friction pad assembly 430 may have an installed thickness. However, repeated or undesired use of the friction pad 430 may cause the friction material to become worn (e.g., causing the friction material to have a worn thickness).

The leaf spring 440 may help pull the friction pad assemblies 430 inward, away from the internally facing surface 411 of the drum 410 until the engine 700 develops enough speed that the centrifugal forces of the friction pad assemblies 430 overcome the leaf spring 440 forces so that the outward facing surface 431 contacts the internally facing surface 411 and the friction between them develops torque to drive the compressor 500. When the friction pad assemblies 430 are pulled away from the internally facing surface 411 of the drum 410 (e.g., keeping the friction material from touching the internally facing surface 411) the centrifugal clutch 400 may be said to be in a retracted position. When the friction pad assemblies 430 are spread outward and engage the internally facing surface 411 of the drum 410 (e.g., allowing the outward facing surface 431 to touch the internally facing surface 411) the centrifugal clutch 400 may be said to be in an extended position. The centrifugal clutch 400 may go from the retracted position to the extended position relative to the speed of the engine 700. This may be due, at least in part, to an increase in centrifugal force that is generated as the speed of the engine 700 increases. For example, as the speed of the engine 700 increases, the rotational speed of the hub 420 and the friction pad assemblies 430 increases, which may result in an increase in centrifugal force. Each leaf spring 440 may be designed to resist a certain amount of centrifugal force so that the centrifugal clutch 400 is in an extended position, driving the loads in the powertrain 300, only when the engine 700 has generated the desired speed. At what point the centrifugal clutch 400 is designed to engage the engine 700 may be dependent on a number of factors including, but not limited to, the size of the compressor 500 and/or the particular cooling load necessitated by the design of the transport refrigeration unit 200.

Figure 5:
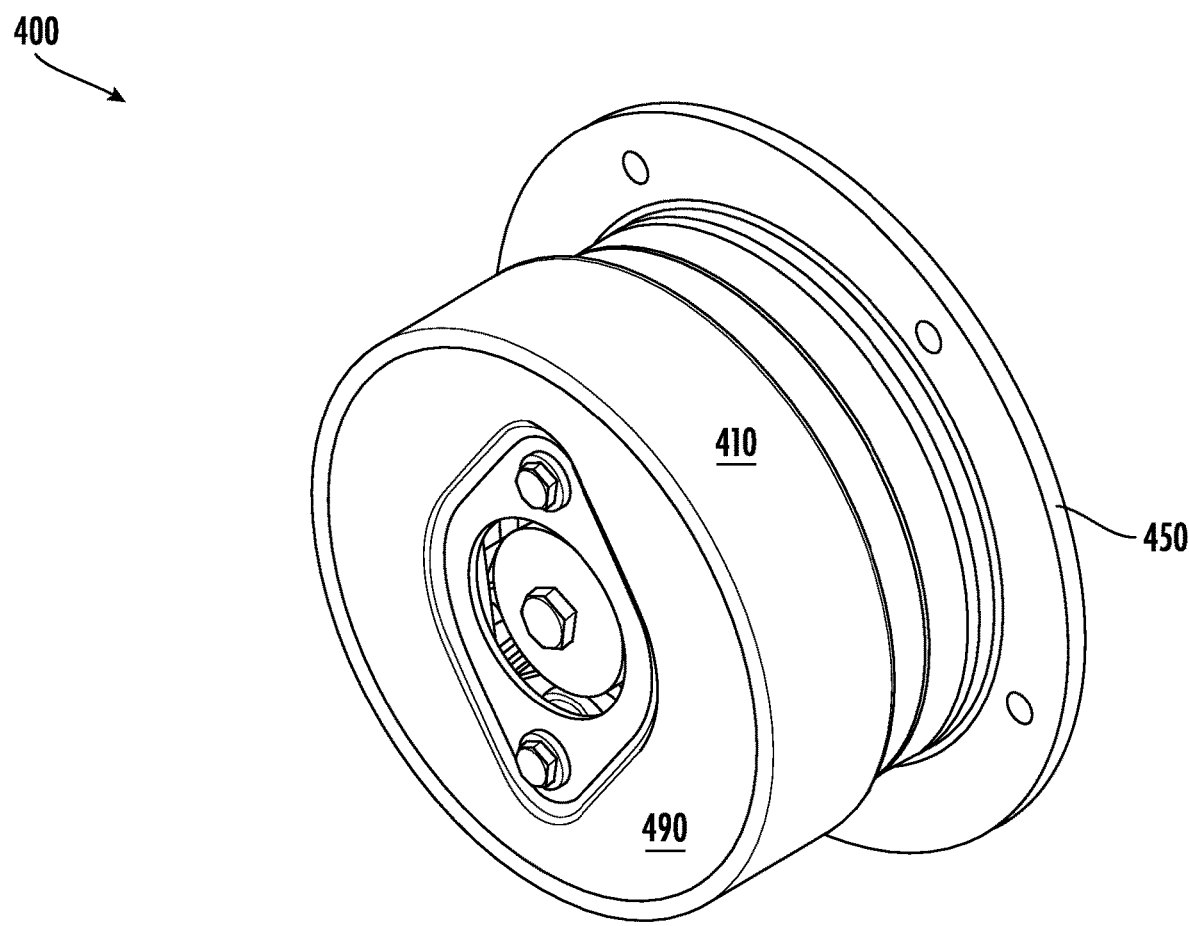
FIG. 5 is an assembled view of the centrifugal clutch shown in FIG. 3 in accordance with one aspect of the disclosure.

The centrifugal clutch 400, in certain instances, is not in an extended position until the hub 420 is rotatably driven at 400 RPMs or greater. For example, the centrifugal clutch 400 may not be in an extended position until the hub 420 is rotatably driven at least 400 RPMs, at least 500 RPMs, at least 600 RPMs, at least 700 RPMs, at least 800 RPMs, at least 900 RPMs, at least 1000 RPMs, at least 1100 RPMs, at least 1200 RPMs, at least 1300 RPMs, at least 1400 RPMs, at least 1500 RPMs, or at least 1600 RPMs. For example, in certain instances, if the hub 420 is not rotatably driven at least 400 RPMs the friction pad assemblies 430 will not engage the internally facing surface 411 of the drum 410, meaning that the compressor 500 may not be driven by the engine 700. To cover the centrifugal clutch 400 during this rotation a plate 490 may be used. An assembled view a centrifugal clutch 400 with the plate 490 is shown in FIG. 5.

To ensure that the engine 700 is capable of being engaged by the centrifugal clutch 400 it is important that the engine 700 has developed enough speed. If the engine 700 doesn't develop enough speed then not enough friction will be generated between the friction pad assemblies 430 and the internally facing surface 411 of the drum 410 to provide enough torque to drive the loads in the powertrain 300 so that the rotational speed of the drum 410 is the same as the engine 700. In this case the clutch 400 is said to be slipping and not fully engaged. Slipping of the clutch 400 may cause the friction material on the friction pad assemblies 430 to wear down (e.g., reducing the thickness of the friction material). However, it should be expected that even routine use (e.g., without slipping) may cause the friction material on the friction pad assemblies 430 to wear down, which may be unavoidable. When the friction material wears out beyond a certain threshold the friction pad assemblies 430 may need to be replaced in order for the friction pad assemblies 430 to be able to engage the internally facing surface 411 of the drum 410. As described above, it can be particularly difficult to know when one or more friction pad assemblies 430 needs to be replaced without removing the clutch 400 from the transport refrigeration unit 200 and disassembling the clutch 400 to visually inspect the one or more friction pad assemblies 430.

Figure 6:
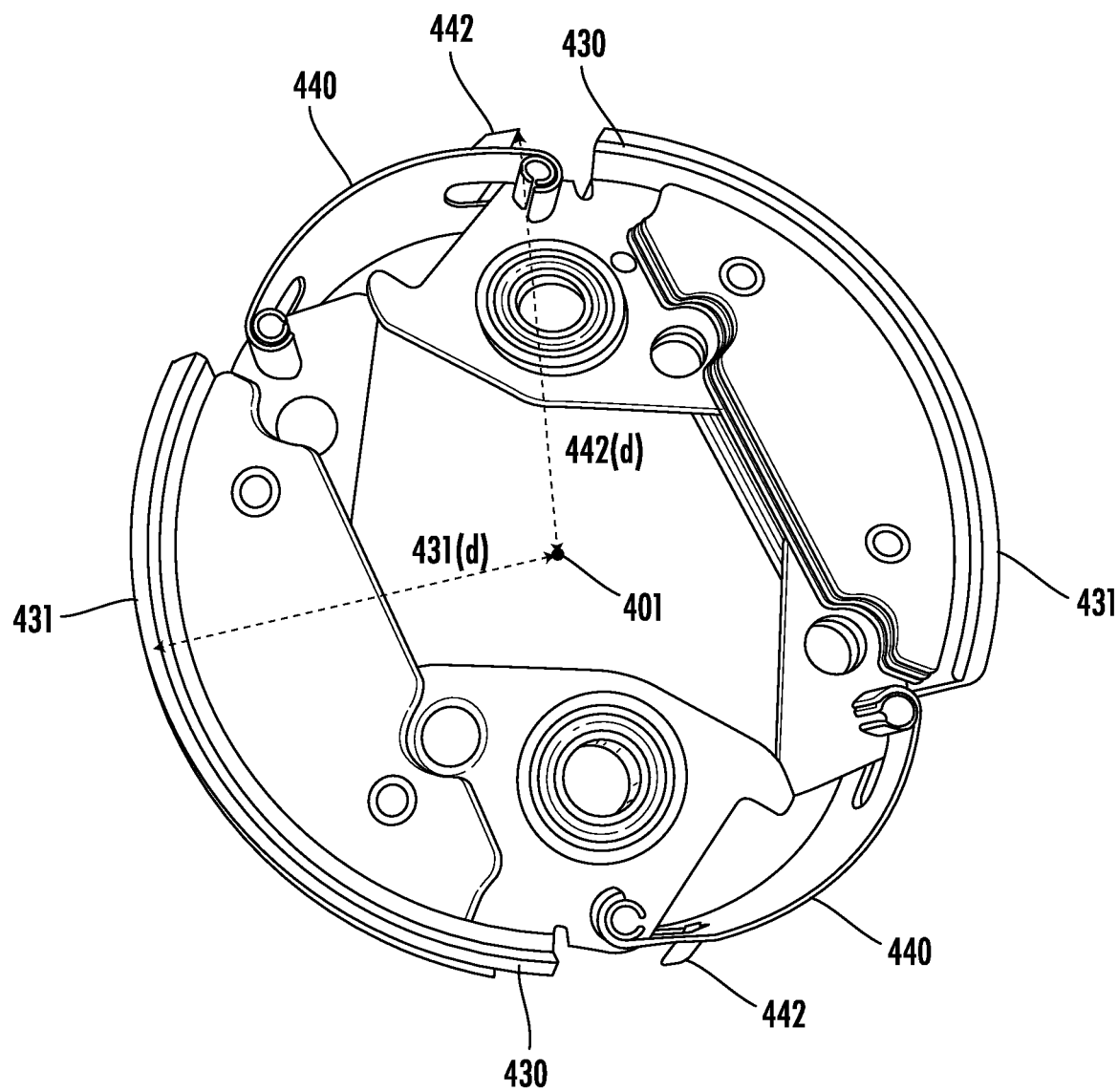
FIG. 6 is a partially assembled view of the centrifugal clutch shown in FIG. 3 with two leaf springs, each leaf spring configured between two friction pads in accordance with one aspect of the disclosure.

To help indicate when one or more friction pad assemblies 430 need to be replaced, at least one leaf spring 440 with an indicator tab 442 may be installed within the centrifugal clutch 400. A partially assembled view of a centrifugal clutch 400 with two friction pad assemblies 430 and two leaf springs 440 with indicator tabs 442 is shown in FIG. 6. As shown, from the side view depicted in FIG. 6, the combination of the friction pad assemblies 430 and the leaf springs 440 may form a circular shape. The indicator tab 442 of each respective leaf spring 440 may be configured to engage the internally facing surface 411 of the drum 410 when the centrifugal clutch 400 is in the extended position and the friction material has a worn thickness.

To allow the indicator tab 442 to engage the internally facing surface 411 of the drum 410 when the friction material of the friction pad assembly 430 has a worn thickness, the indicator tab 442 may be configured to extend radially outward to approximately the same radial distance from the center 401 of the centrifugal clutch 400, when the centrifugal clutch 400 is in the extended position, as the point of which the friction material is said to be worn. For example, the radial distance 442(d) between the indicator tab 442 and the center 401 of the centrifugal clutch 400 may be the same as the radial distance 431(d) between the point of which the friction material is said to be worn, when the centrifugal clutch 400 is in the extended position.

The friction material of any given friction pad assembly 430 may, in certain instances, be said to have a worn thickness when 10% of the friction material is left (e.g., meaning that, in certain instances, 90% of the friction material may be worn off a friction pad 430 before it needs replacement). The worn thickness, in certain instances, may be between 1% and 10%, between 1% and 15%, between 1% and 20%, between 1% and 30%, between 1% and 40%, between 1% and 50%, between 10% and 15%, between 10% and 20%, between 10% and 30%, between 10% and 40%, between 10% and 50%, between 15% and 20%, between 15% and 30%, between 15% and 40%, between 15% and 50%, between 20% and 30%, between 20% and 40%, between 20% and 50%, between 30% and 40%, between 30% and 50%, or between 40% and 50% of the installed thickness.

The indication that one or more friction pad assemblies 430 need to be replaced may be in the form of an audible sound created when the indicator tab 442 engages the internally facing surface 411 of the drum 410. It is envisioned, that a technician and/or operator, when hearing the audible sound created by the indicator tab 442 engaging the internally facing surface 411 of the drum 410, would be alerted that one or more friction pad assemblies 430 within the centrifugal clutch 400 of the transport refrigeration unit 200 are in need of replacement. As such, the leaf spring 440, through inclusion of an indicator tab 442, may provide a clear audible indication of the present state (e.g., whether or not worn) of at least one friction pad assembly 430, without the need of removing the clutch 400 from the transport refrigeration unit 200 and disassembling the clutch 400 to visually inspect the one or more friction pads 430. The indicator tabs 442 may be designed so that the audible indication is tuned to be loud and distinguishable from other ambient noises. This tuning may be embodied by various geometries including the single indicator tab depicted in 442.

In certain instances, the indicator tab 442 may extend slightly further than the point at which the friction material is said to be worn, when in the engaged position. This may be due, at least in part, because at least a portion of the indicator tab 442 may wear off before creating an audible sound. For example, the radial distance 442(*d*) between the indicator tab 442 and the center 401 of the centrifugal clutch 400 may be slightly greater than the radial distance 431(*d*) between the point at which the friction material is said to be worn, when the centrifugal clutch 400 is in the extended position. In certain instances, slightly further may mean that the radial distance 442(*d*) between the indicator tab 442 and the center 401 of the centrifugal clutch 400 may be a few millimeters (e.g., 0.1 to 3 millimeters) greater than the radial distance 431(*d*) between the point of which the friction material is said to be worn, when the centrifugal clutch 400 is in the extended position. In certain instances, the radial distance 442(*d*) between the indicator tab 442 and the center is at least 0.2 mm greater, at least 0.5 mm greater, at least 1.0 mm greater, at least 1.5 mm greater, at least 2.0 mm greater, or at least 2.5 mm greater than the radial distance 431(*d*) between the point of which the friction material is said to be worn, when the centrifugal clutch 400 is in the extended position. It being envisioned that the indicator tab 442 is positioned such that an audible sound is created when at least one friction pad 430 is in need of replacement.

Figure 7:
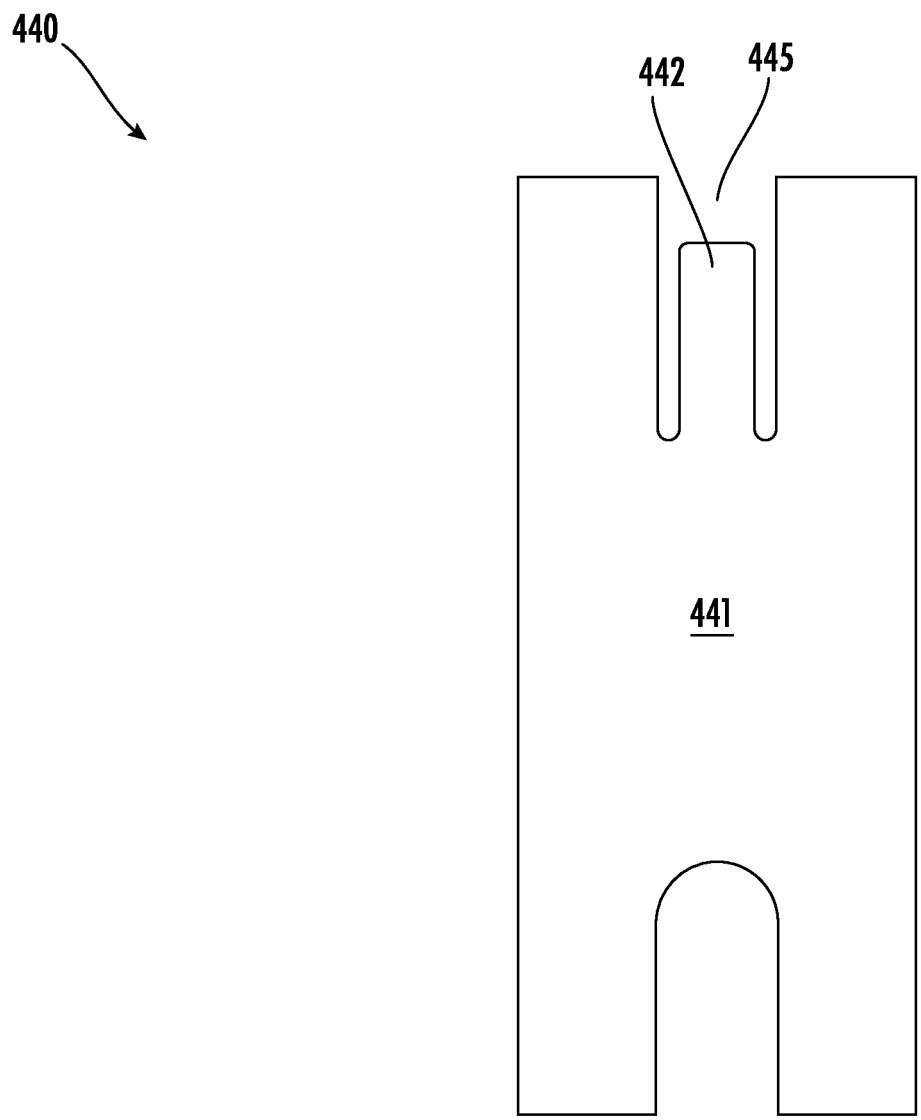
FIG. 7 is a top view of one of the leaf springs shown in FIG. 6 in accordance with one aspect of the disclosure.
Figure 8:
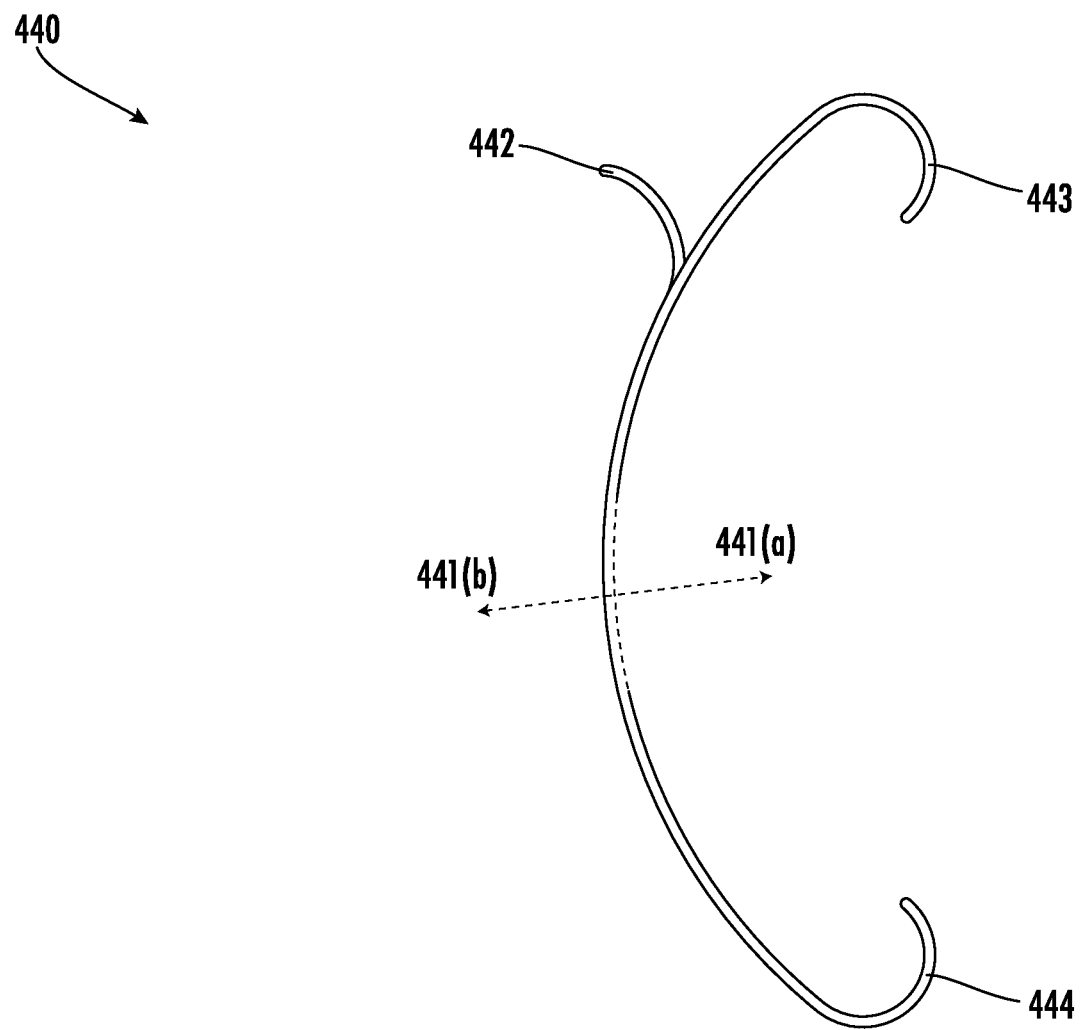
FIG. 8 is a side view of one of the leaf springs shown in FIG. 6 in accordance with one aspect of the disclosure.

A top view of one of a leaf spring 440 in accordance with one aspect of the invention is shown in FIG. 7. The leaf spring 440 includes a frame 441 with a first side 441(*a*) and a second side 441(*b*), and an indicator tab 442. The first side 441(*a*) and the second side 441(*b*) are depicted in FIG. 8, which shows a side view of a leaf spring 440. As shown in FIG. 8, the indicator tab 442 is configured to extend from the second side 441(*b*) of the frame 441. From a side view, as shown in FIG. 8, the frame 441 may be configured in a C-shape in the direction of the first side 441(*a*) of the frame 441. From a top view, as shown in FIG. 7, the frame 441 may be configured in an H-shape, the indicator tab 442 extending from a slot 445 defined by the H-shape. The indicator tab 442, when viewed from a side view, as shown in FIG. 8, may be configured in a C-shape.

Figure 9:
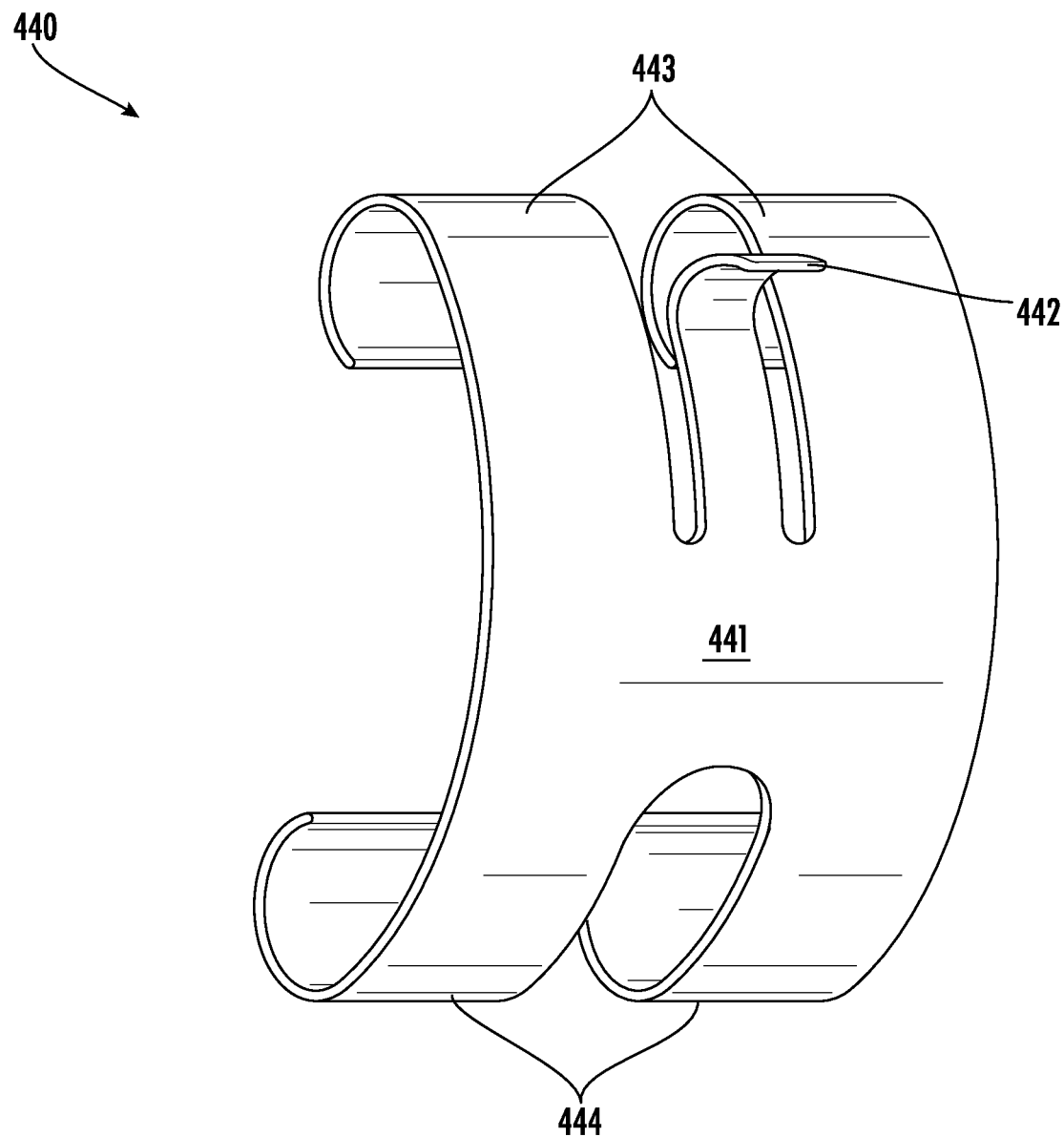
FIG. 9 is a perspective view of one of the leaf springs shown in FIG. 6 in accordance with one aspect of the disclosure.

The leaf spring 440 may include a first end 443 and a second end 444, each respectively configured (e.g., using an arc) to latch to one or more friction pad assemblies 430. For example, the first end 443 may latch to one friction pad assembly 430 and the second end 444 may latch to a different friction pad assembly 430. One potential configuration of two leaf springs 440 latching onto two friction pad assemblies 430 is shown in FIG. 6. Although not depicted, in certain instances, only one of the leaf springs 440 may include an indicator tab 442. Also although not depicted, in certain instances, the indicator tab may be on the opposite end of the leaf spring 440 or on both ends of the leaf spring 440. As shown in FIG. 6, in certain instances, each leaf spring 440 may include an indicator tab 442. It is envisioned that each leaf spring 440 may be configured as one unified structure (e.g., formed of one continuous piece of a metal), for example, where the frame 441 is bent in a different direction than the indicator tab 442. A perspective view of a leaf spring 440 is shown in FIG. 9, which shows the frame 441 and the indicator tab 442 being bent in an opposite directions.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A centrifugal clutch of a transport refrigeration unit, the centrifugal clutch comprising:
    a drum comprising an internally facing surface;
    a hub disposed within the drum, the hub configured to be rotatably driven by an engine configured to power the transport refrigeration unit;
    at least two friction pad assemblies connected to the hub, each friction pad assembly comprising a radially outward facing surface comprising a friction material for contacting the internally facing surface, the friction material comprising an installed thickness; and
    at least one leaf spring configured between each respective friction pad, each leaf spring comprising:
        a frame comprising a first side and a second side; and
        an indicator tab extending from the second side of the frame.

2. The centrifugal clutch of claim 1, wherein the centrifugal clutch defines an extended position and a retracted position.

3. The centrifugal clutch of claim 2, wherein the centrifugal clutch is in an extended position when the hub is rotatably driven at 400 RPMs or greater.

4. The centrifugal clutch of claim 2, wherein the indicator tab is configured to engage the internally facing surface of the drum when the centrifugal clutch is in the extended position and the installed thickness is worn to a worn thickness.

5. The centrifugal clutch of claim 4, wherein the worn thickness is approximately 10% of the installed thickness.

6. The centrifugal clutch of claim 4, wherein the engaging of the internally facing surface of the drum by the indicator tab creates an audible sound.

7. The centrifugal clutch of claim 6, wherein the audible sound indicates that at least one friction pad is in need of replacement.

8. The centrifugal clutch of claim 1, wherein the centrifugal clutch is configured to transmit a torque from the engine to a compressor within the transport refrigeration unit.

9. The centrifugal clutch of claim 1, wherein the engine is within the transport refrigeration unit and is a diesel engine.

10. The centrifugal clutch of claim 1, wherein the friction material is a synthetic resin impregnated with metal, organic, or ceramic fibers.

11. The centrifugal clutch of claim 1, wherein, from a side view, each friction pad is configured in a C-shape.

12. The centrifugal clutch of claim 1, wherein, from a side view, the combination of the friction pads and the leaf springs form a circular shape.

13. A leaf spring for a centrifugal clutch of a transport refrigeration unit, the leaf spring comprising:
    a frame comprising a first side and a second side; and an indicator tab extending from the second side of the frame.

14. The leaf spring of claim 13, wherein, from a side view, the frame is configured in a C-shape in the direction of the first side.

15. The leaf spring of claim 13, wherein, from a top view, the frame is configured in an H-shape, the indicator tab extending from a slot defined by the H-shape.

16. The leaf spring of claim 13, wherein, from a side view, the indicator tab is configured in a C-shape.

17. The leaf spring of claim 13, further comprising a first end and a second end, each of the first end and the second end being configured in an arc.

18. The leaf spring of claim 17, wherein the first end is configured to latch to a first friction pad, and the second end is configured to latch to a second friction pad.

19. The leaf spring of claim 13, wherein the indicator tab and the frame are unified.

20. The leaf spring of claim 13, wherein the leaf spring is comprised of a metal.

* * * * *